J. WEGNER.
CUTTING AND STRIPPING MACHINE.
APPLICATION FILED MAY 21, 1920.

1,384,984.

Patented July 19, 1921.
5 SHEETS—SHEET 4.

WITNESS

INVENTOR
Julius Wegner
BY
Briesen Schrell
ATTORNEYS

UNITED STATES PATENT OFFICE.

JULIUS WEGNER, OF NEW YORK, N. Y., ASSIGNOR TO HENRY SPADONE AND WALTER W. SPADONE, OF NEW YORK, N. Y., A COPARTNERSHIP DOING BUSINESS AS SPADONE MACHINE CO.

CUTTING AND STRIPPING MACHINE.

1,384,984.  Specification of Letters Patent.  Patented July 19, 1921.

Application filed May 21, 1920. Serial No. 383,030.

*To all whom it may concern:*

Be it known that I, JULIUS WEGNER, a citizen of the United States, and resident of the borough and county of Queens, city and State of New York, have invented certain new and useful Improvements in Cutting and Stripping Machines, of which the following is a specification.

My invention relates to fabric cutting machines and more particularly to machines for the transverse cutting of frictioned duck used in the manufacture of tires, hose and the like and has for its object to provide an improved machine of this character whereby the duck is efficiently cut into any desired lengths and at any angle and in which the sheeting upon which the duck is generally wound is positively and efficiently stripped therefrom prior to the cutting operation. Other more specific objects of my invention will appear from the description hereinafter and the features of novelty will be pointed out in the appended claims.

Reference is to be had to the accompanying drawings, which illustrate an example of my improved machine, and in which Fig. 12 is an enlarged detail view showing the feed roll arrangement for the duck.

In the drawings 10 represents a main frame of suitable construction on which is mounted in suitable bearings 11, a power shaft 12 which may be driven in any convenient manner as for instance by means of a motor 13 having a pinion 14 in mesh with a gear 15 mounted on said shaft 12. A sleeve 16 is loosely mounted upon the latter and carries a pinion 17 which meshes with a gear 18 secured upon a counter shaft 19 journaled in bearings 20 located upon the frame 10. The sleeve 16 is selectively connected with and disconnected from the shaft 12 by means of suitable clutch mechanism 21 which may be operated either by means of a treadle 22 or by hand through the medium of connected levers 23.

Figure 1:
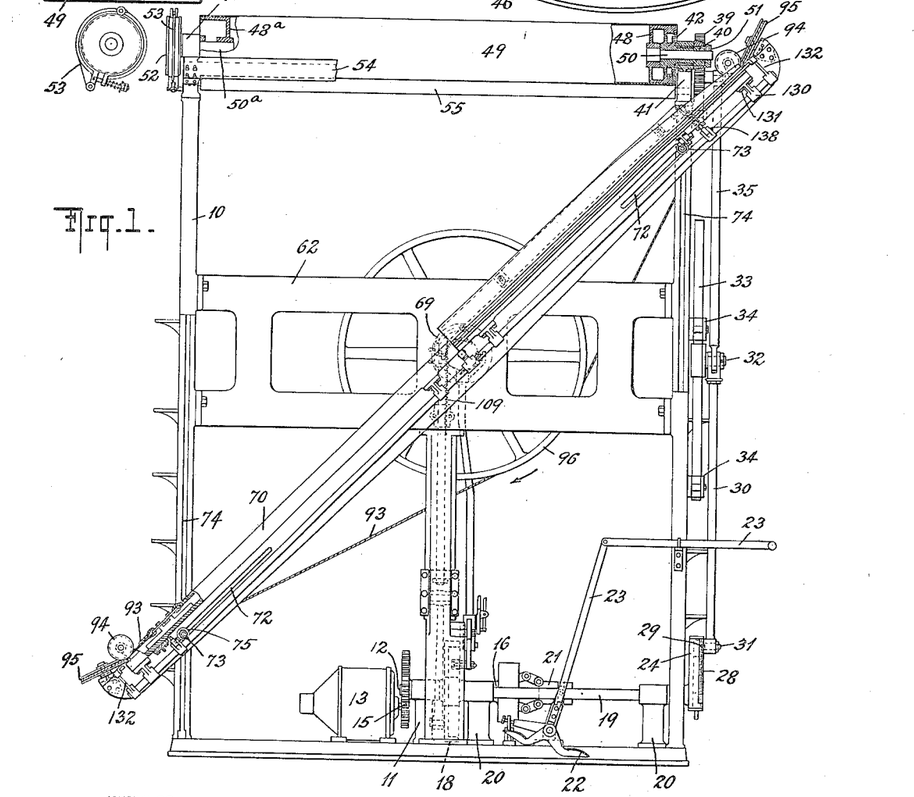
Figure 1 is a front elevation.
Figure 1A:
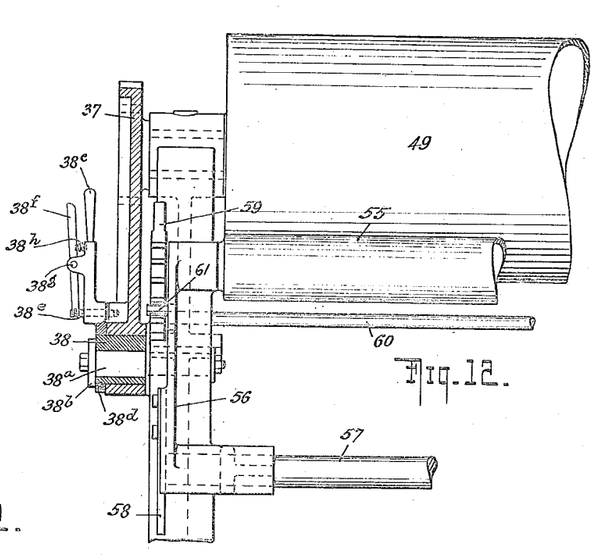
Figure 2:
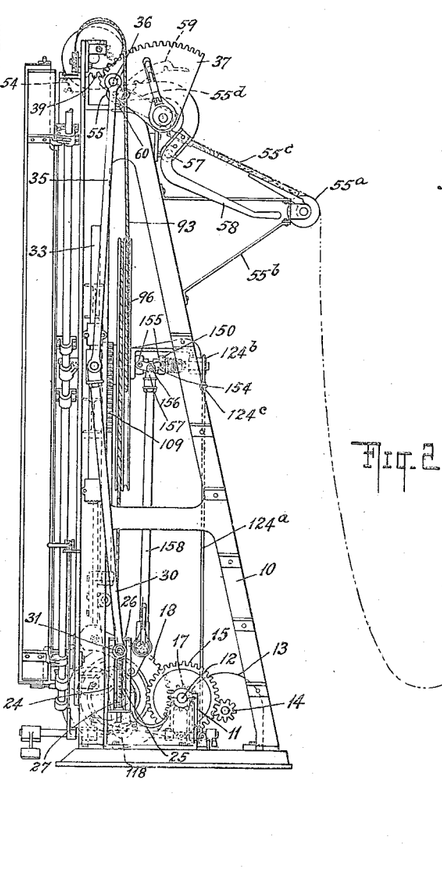
Fig. 2 is a side elevation.
Figures 10, 11:
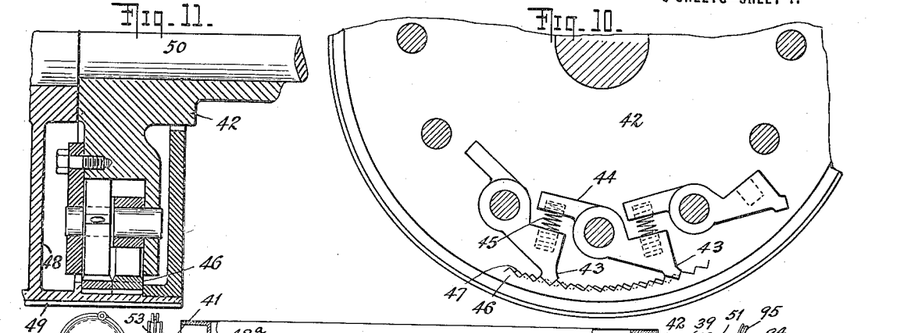
Fig. 10 is a detail section illustrating a novel form of ratchet feed included in my invention.
Fig. 11 is a detail cross-section thereof.

At its one end the counter shaft 19 carries a member 24 having a longitudinally extending slot 25 in which a block 26 is adjustably secured; in order to provide for minute adjustments of said block a screw-threaded stem 27 may be rotatably mounted on said member 24 in a screw-threaded engagement with the block 26, a suitable key being preferably provided for facilitating the manipulation of said stem. In order to visibly indicate the adjustments a scale 28 may be fixed upon the member 24 and a coöperating pointer 29 located upon the block 26 as shown in Fig. 1. A rod 30 is pivotally connected at 31 with said block and at 32 is pivotally connected with a bar 33 vertically slidable in bearings 34 mounted upon the frame 10. A second rod 35 has its one end connected with the pivot 32 and at its other end is pivotally secured at 36 to a toothed segment 37 which meshes with a pinion 39, as shown in Fig. 2. For the purposes to be more fully described hereinafter the segment 37 is mounted upon an eccentric bushing 38 which in turn is rotatably carried by a stud shaft $38^a$ on the frame 10, said bushing being secured against axial displacement on said shaft $38^a$ by a disk $38^b$. A lever $38^c$ is secured upon said bushing 38 by means of a set screw $38^d$ and is provided with a latch $38^e$ whereby said segment 37 is fixed against movement relatively to said bushing 38. The latch $38^e$ is capable of being withdrawn through the medium of a member $38^f$ pivoted at $38^g$ upon said lever $38^c$ and maintained in and returned to its normal position by the action of a spring $38^h$. With this arrangement the lever $38^c$ may be actuated, after the latch $38^e$ has been withdrawn, to rotate the bushing 38 upon the shaft $38^a$ and relatively to the segment 37; because of the eccentric position of said bushing upon said shaft this relative rotation thereof will move the segment 37 downwardly and out of mesh with the pinion 39. This permits an independent manual rotation of the feed roller, to be described hereinafter, without requiring the entire mechanism to be turned over, if for any reason such actuation of said feed roller is desirable, for instance, to adjust the duck. The pinion 39 is secured upon a sleeve 40 which is journaled in a bearing 41 forming part of or secured to the frame 10, said sleeve preferably forming an integral part of a ratchet disk 42 as shown in Figs. 1 and 11. The ratchet disk 42 carries a plurality of pivotally mounted pawls 43 each of which is formed with a projection 44 extending backward over the next adjacent pawl as illustrated in Fig. 10; springs 45 are located between each pawl 43 and the projection 44 of the next succeeding pawl and exert a tension tending to swing the pawls outwardly. The pawls 43 coöperate with ratchet rings 46 and 47, the teeth of one ring being set slightly ahead of the teeth in the other ring as shown in Fig. 10. The rings 46 and 47 are secured within an end plug 48 which in turn is fastened within the one end of a hollow feed roller 49, the plug 48 being fixed upon a shaft 50 which extends through and is journaled in the sleeve 40; an annular member 51 may be fastened upon the projecting outer end of the shaft 50 adjacent to the outer end of said sleeve 40 to maintain the parts against axial displacement. A second end plug 48$^a$ is secured within the opposite end of the roller 49 and is fixed upon a short shaft 50$^a$ which is journaled in a second bearing 41 on the frame 10 and projects beyond the same for the accommodation of a brake pulley 52 with which a band brake 53 coöperates to control the rotative speed of the feed roller 49. A member 54, shown by dotted lines in Fig. 2, is mounted upon the frame 10 in tangent relation for the purpose to be more fully described hereinafter.

In order to maintain the material under a proper tension as it passes over the feed roller 49 a tension roller 55 is provided, said roller 55 being journaled upon arms 56 pivoted at 57 upon the frame 10; one or both of said arms 56 may be provided with handles 58 whereby the manipulation of the tension roller 55 is facilitated. The arrangement includes further a tension adjuster comprising a notched member 59 pivoted at 60 upon the frame 10 and coöperating with a pin 61 located on one of the arms 56 to fix the position of the tension roller 55.

A guide roller 55$^a$ journaled upon brackets 55$^b$ secured to the frame 10, may be constructed to accommodate material of different widths. A board 55$^c$ has its one end pivotally connected with the brackets 55$^b$ and at its other end is provided with supports 55$^d$ which rest upon the arms 56 of the tension roller 55 whereby said board 55$^c$ is positioned at an inclination leading from the guide roller 55$^a$ to the tension roller 55 as shown in Fig. 2.

A cross-brace 62 extends between and is bolted to the opposite side members of the frame 10 and is provided with an opening 63 into which fits the neck 64 of a raceway locator 65, said neck 64 being screw-threaded for the accommodation of a lock nut 66 which is located within a recess 67 of said cross-brace and by bearing against the surface of said recess serves to secure the locator 65 in surface engagement with the front face of said cross-brace 62. A screwbolt 68 projects from the latter into a segmental slot 69 of said locator 65 which is provided with a transverse recess for the reception of the raceway 70 secured to said locator by one or more bolts 71. Near its opposite ends the raceway 70 is provided with longitudinal slots 72 through which bolts 73 project, the heads of said bolts being slidable in vertical grooves 74 formed in the upright side members of the frame 10; the bolts 73 and coöperating nuts 75 serve to clamp the raceway 70 upon the frame 10 in an adjusted position as will be more fully explained hereinafter.

Figures 3, 13:
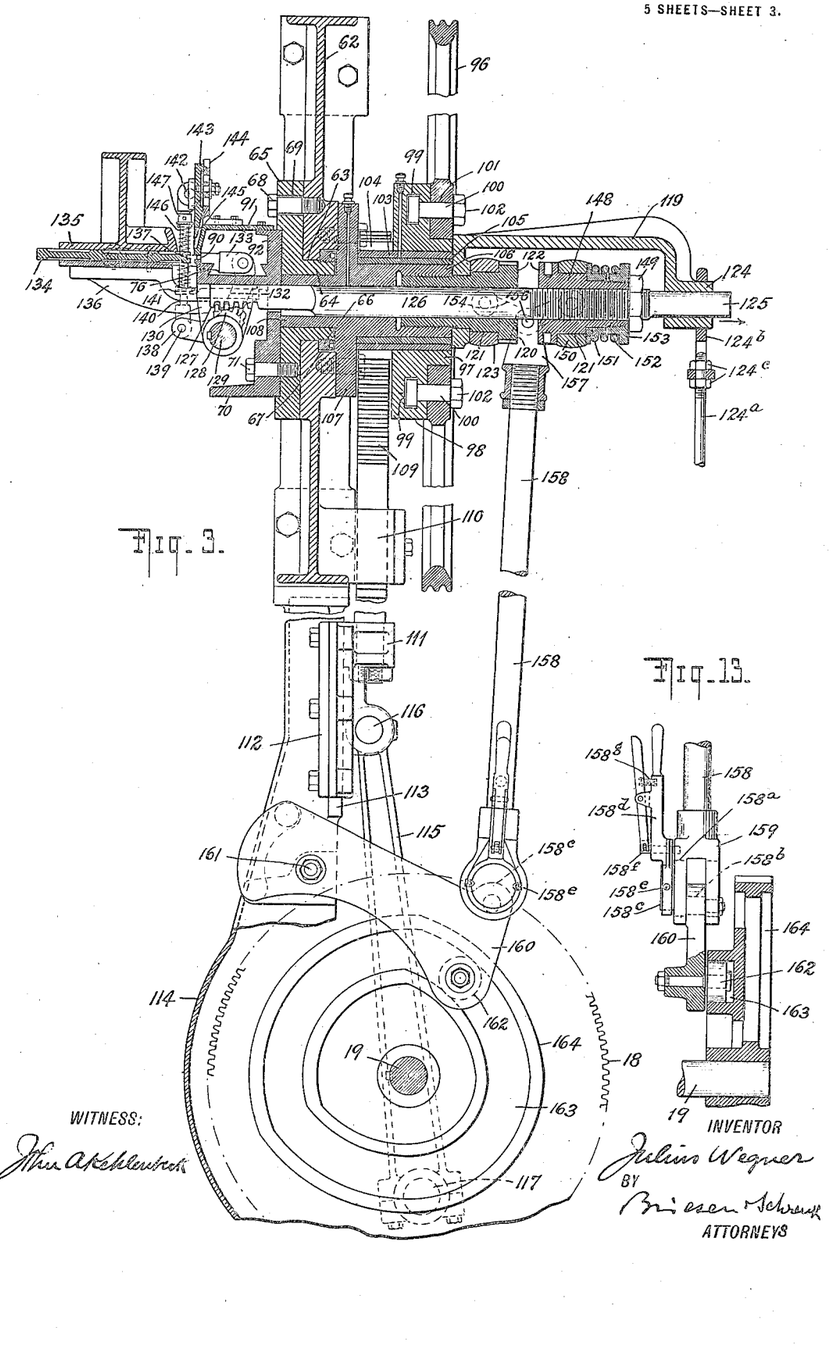
Fig. 3 is a detail vertical section on an enlarged scale.
Fig. 13 is an enlarged detail section illustrating a releasing device included in the machine.
Figure 6:
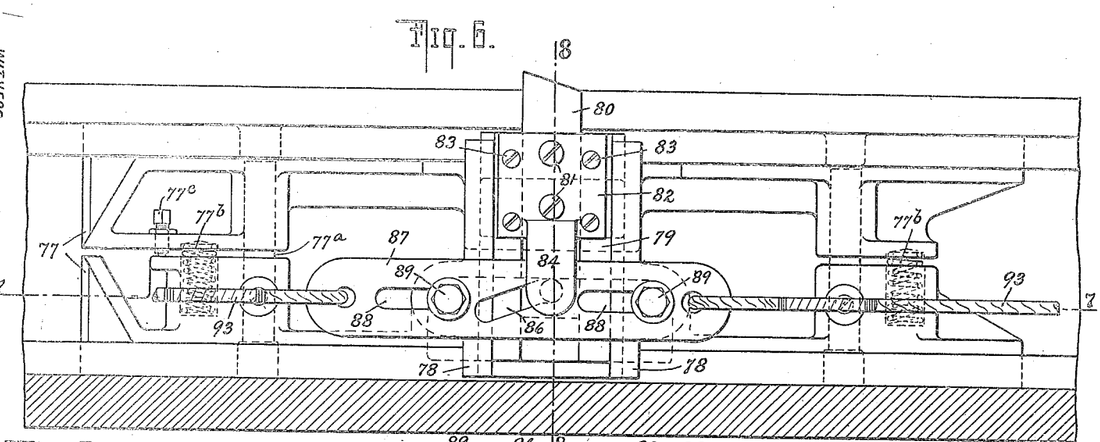
Fig. 6 is an enlarged detail plan view partly in section of the cutting mechanism.
Figure 7:
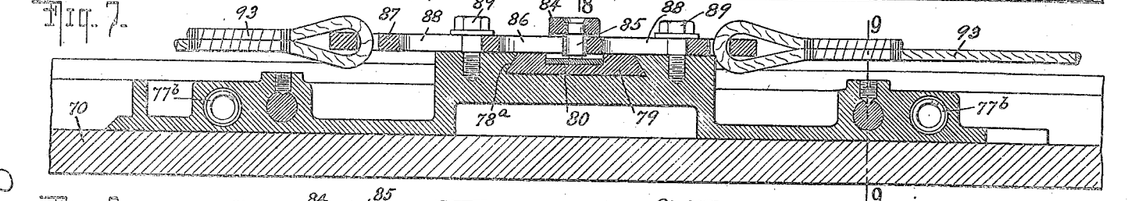
Fig. 7 is a longitudinal section thereof on the line 7—7 of Fig. 6.
Figure 8:
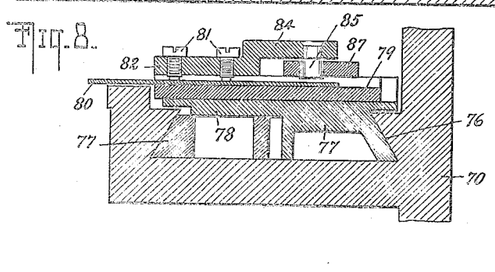
Figs. 8 and 9 are cross-sections taken respectively on the lines 8—8 and 9—9 of Fig. 6.
Figure 9:
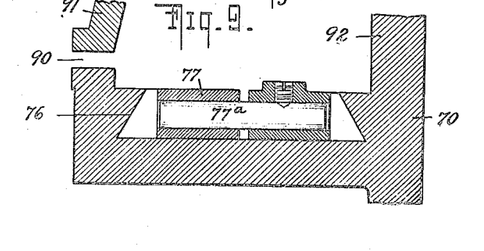

The raceway 70 is provided with a lengthwise extending and preferably undercut guideway 76 in which a carriage 77 is slidably fitted, said carriage preferably consisting of two complemental sections fitted together by means of pins 77$^a$ so as to be capable of moving toward and away from each other and being provided with springs 77$^b$ which exerts a tension tending to separate said carriage sections. A stop in the form of a set screw 77$^c$ may also be provided on the one section so as to bear against the other section and preventing said sections from binding in the raceway by being distorted relatively to each other during operation. One of said sections is constructed with an extension 78 overlying the other section and having a transverse preferably undercut recess 78$^a$ in which a knife holder 79 is mounted. A knife 80 is adjustably secured upon the holder 79 by means of set screws 81 passing through a plate 82 which is itself fastened to said holder by screws 83 and which has an off-set lug 84 extending therefrom as shown in Figs. 6 and 8. A projection 85 extends from said lug 84 into the cam-slot 86 of a knife-actuating member 87 which is slidable lengthwise of the carriage 77 within the limits of slots 88 formed in said member 87 and through which bolts 89 pass into said carriage. The knife-actuating member 87 is arranged to project and withdraw the knife through a slot 90 formed along the one edge of the raceway by means of a cover 91 fastened upon an upright flange 92 extending along the opposite edge of said raceway as shown in Fig. 3. At its opposite ends the member 87 is formed with apertures in which the opposite ends of a cable 93 are secured, said cable extending beneath jockey cable wheels 94 and over cable wheels 95 all of which are mounted on the raceway 70; the cable 93 further extends about a main cable wheel 96, the periphery of which is preferably grooved for the accommodation of said cable. The cable wheel 96 is fitted upon the tubular neck 97 of a disk 98 which is provided with an annular slot 99 of T-shape in cross-section; T-head bolts 100 are located in said slot 99 and project beyond the same through suitable holes 101 in the wheel 96 and in combination with nuts 102 serve to securely fasten the wheel 96 to said disk 98. The latter is keyed upon the tubular sleeve 103 of a drive pinion 104 to rotate therewith, said pinion in turn being rotatably mounted upon a bushing 105 located upon the pivot member 106 of a pivot plate 107 which is fastened to the rear face of the cross-brace 62 and has an annular shoulder fitted into the recess 67 thereof. The pivot plate 107 is provided with an axial extension 108 which fits into the axial bore of the neck 64 of the raceway locator 65 and projects forwardly therein toward the raceway 70 as shown in Fig. 3. The extension 108 and pivot member 106 have a common axial bore which terminates in an internally screw-threaded recess at the free end of said pivot member 106, said recess being of relatively larger diameter than said axial bore to form an internal shoulder as shown in Fig. 3. For the purpose to be more fully described hereinafter, the pinion 104 is in mesh with a vertically reciprocating rack 109 slidably mounted in a guide 110 carried by the cross-brace 62 and connected at its lower end with a cross-head 111 having vertical guideways formed by plates 112 attached to said cross-head. The latter is vertically movable on a slide member 113 which fits into said guideways and is located upon the base of the frame 10, said slide member 113 being formed with a crank-case 114 as shown in Fig. 3. A connecting rod 115 is pivotally connected at 116 with the cross-head 111 and at 117 with the gear 18 which is secured upon the counter shaft 19 at the end thereof opposite to the end at which the slotted member 24 is carried, the pivot 117 describing an operative path extending into the crank-case 114 which thus serves as a protection against contact with the connecting rod 115 and other elements.

A stationary bracket 119 is secured in place by means of a toggle sleeve 120 which extends through said bracket and is screwed into the internally screw-threaded recess of the pivot member 106, said sleeve 120 having a relatively enlarged bearing 121, which forms an annular shoulder engaging said bracket 119 and securely clamping it in place as shown in Fig. 3. At its outer end the toggle-sleeve 120 is provided with an annular flange 122 whereby a toggle-swivel 123 is maintained against axial displacement on said bearing 121. The bracket 119 is constructed with a bearing 124 located in axial registry with the common bore of the extension 108, pivot member 106 and toggle-sleeve 120 and providing a support in which the end 125 of a rod 126 is slidably mounted. The latter is slidably fitted within the aforesaid common bore of the extension 108, pivot member 106 and toggle-sleeve 120 and terminates in a rack 127 which meshes with a toothed quadrant 128 secured upon a shaft 129 which is journaled upon brackets 130 secured to the raceway 70 in any suitable manner as by means of suitable bolts 131.

In order to increase the rigidity of the machine and to reduce vibration in the bearing 124 as much as possible, I prefer to provide a brace in the form of a supporting rod 124$^a$ which is fastened to the base of the frame 10 and to a yoke 124$^b$ which in turn is connected with said bearing 124 as shown in Fig. 3. The connection between the rod 124$^a$ and the yoke 124$^b$ is preferably adjustable; for this purpose the rod 124$^a$ passes loosely through the yoke 124$^b$ and is screw-threaded at its upper end for the accommodation of nuts 124$^c$ which bear against said yoke in opposite directions and permit its adjustment upon said rod as will be readily apparent.

Figure 14:
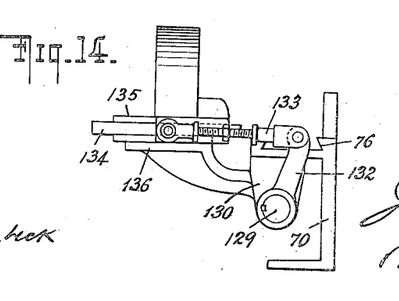
Fig. 14 is a detail view illustrating the clamp bar connections.

The shaft 129 also carries levers 132 located at opposite ends thereof and connected by means of members 133 with a clamp bar 134 slidably mounted in a support 135 carried by brackets 136 fastened to the raceway 70. As shown in Fig. 14 the members 133 are preferably adjustable as to length in order to permit the clamp bar 134 to be adjusted to compensate for different thicknesses of duck and to permit said bar to be reset if it becomes distorted or out of adjustment from any cause. The clamp bar 134 is provided along its clamping edge with a groove 137 which registers with the slot 90 of the raceway, said clamp bar being movable toward and away from said raceway as will appear more fully hereinafter. In addition the shaft 129 carries cranks 138 pivotally connected at 139 with rods 140 extending vertically through guides 141 fixed upon the raceway 70 and pivotally connected at 142 with a stripper bar 143 which is vertically slidable on brackets 144 secured upon the raceway cover 91 and which carries a stripper blade 145 movable across the slot 90 and clamp bar 134. Springs 146 are located upon the rods 140 and bear with one end against the guides 141 and with their other end against collars 147 secured upon said rods.

That part of the rod 126 which normally bridges the space between the toggle-sleeve 120 and the bracket bearing 124 is screw-threaded for the accommodation of a second toggle-sleeve 148 similar to the toggle-sleeve 120 and fixed against unintentional axial displacement on said rod 126 by a lock nut 149. A toggle-swivel 150 is located upon the bearing 121 of the toggle-sleeve 148 between the annular flange 122 thereof and a collar 151 yieldingly mounted upon said toggle-sleeve 148 and controlled by a spring 152 which bears against said collar 151 and against another collar 153, the latter being in screw-threaded engagement with said toggle-sleeve 148 and being fixed in position by the lock nut 149. The toggle-swivels 123 and 150 are constructed with outwardly extending bosses to which toggle-links 154 are pivotally secured by means of bolts or the like 155, said links 154 being pivotally connected at 156 with each other and with a toggle-yoke 157 as shown in Figs. 2 and 3. The latter is fixed, for instance, by screw-threading upon one end of a connecting rod 158, the other end of which is formed with a fork 159 which straddles a rocking member 160 pivotally mounted at 161 upon the crank-case 114; the connection between the fork 159 and the rocking member 160 comprises a pair of axially spaced eccentrics 158$^a$ fitted within the members of said fork as shown in Figs. 3 and 13 and connected by means of a pivot stud 158$^b$ which extends through said member 160. The one eccentric 158$^a$ is formed with an extension 158$^c$ upon which a lever 158$^d$ is fastened by means of set screws 158$^e$, the lever 158$^d$ to actuate a latch 158$^f$ whereby the eccentrics and the connecting rod 158 are maintained in fixed relation or released for the purpose to be more fully set forth farther on in the description; a spring 158$^g$ serves to maintain said lever 158$^d$ in its normal position and to return it thereto. With this arrangement a pivotal actuation of the lever 158$^d$, after the latch 158$^f$ has been withdrawn to an inoperative position, will rotate the eccentrics 158$^a$ relatively to the rod 158 and as a result will pull the same downwardly whereby the parts are actuated to shift the clamp bar 134 to its inoperative position. It is thus possible to bring the clamp bar 134 to a position in which the duck is released, without requiring the entire apparatus to be operated; this is of importance, for instance, if the machine is stopped with the bar 134 in its clamping position and it is desired to free the duck therefrom; the rocking member 160 carries a roller 162 which extends into the cam groove 163 of a cam 164 preferably forming an integral part of the gear 18 secured upon the countershaft 19.

The apparatus includes further a supplemental or auxiliary frame 165 which in some cases may constitute a part of the main frame 10 or which may comprise a unit as shown in the illustrated example. A gear 166 in driving connection with the pinion 166$^a$ of the motor 166$^b$ is secured upon a shaft 167 journaled in suitable bearings 168 on said auxilary frame 165 and which carries also a driving disk 169, the face of which is in driving engagement with the periphery of a driven disk 170. The latter is adjustable across the face of said driving disk 169 in the customary manner, by being slidably mounted upon a counter shaft 171 journaled in bearings 172, suitable provision being made for causing the driven disk 170 in all of its adjustments to rotate with the counter shaft 171. Any convenient and well known means may be provided for shifting the disk 170 as, for instance, by providing it with a grooved collar 173 with which a fork 174 is connected, said fork being in screw-threaded engagement with a screw-shaft 175 rotatably mounted in a bearing 176, and held therein against any material displacement in axial directions. The screw-shaft 175 may be operatively rotated in any convenient manner as, for instance, by securing thereon a sprocket wheel 176$^a$ connected through the medium of a sprocket chain 177 with a second sprocket wheel 178 secured upon a shaft 179 journaled on the frame 165 and provided with a handled actuating wheel 180 or its equivalent.

For the purposes of control the counter shaft 171 may be operatively connected with a clutch shaft 181 by means of a bevel pinion 182 and a bevel gear 183 located respectively on the counter shaft 171 and clutch shaft 181, the latter being journaled in a bearing 184 upon the auxiliary frame 165. A clutch member 185 is slidably mounted upon the clutch shaft 181 so as to rotate therewith and, by means of a clutch lever 186 or the like, is thrown into and out of engagement with a companion clutch member 187 carried by a sprocket pinion 188 loosely mounted upon said clutch shaft 181.

Figure 4:
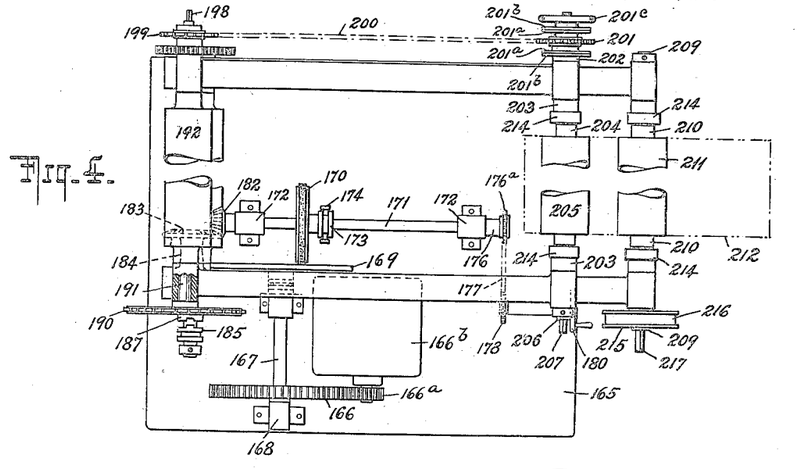
Fig. 4 is a plan view of the stripper.
Figure 5:
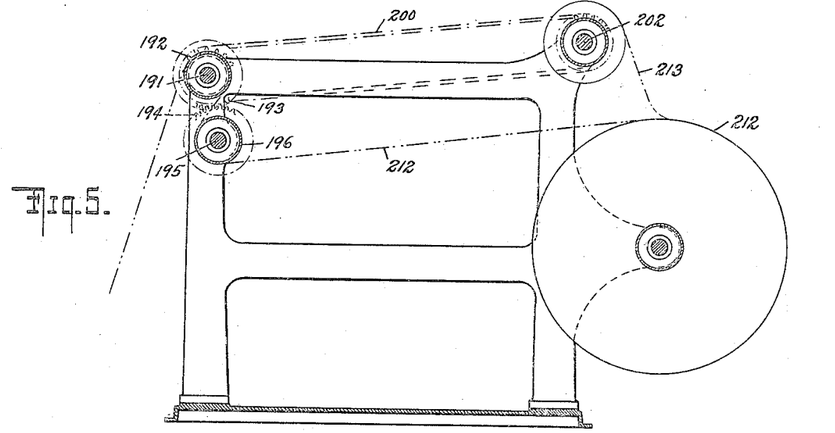
Fig. 5 is a sectional elevation thereof.

The pinion 188 is connected, by means of a sprocket chain 189, with a sprocket wheel 190 secured upon a shaft 191 journaled on the frame 165 and carrying a feed roll 192 as shown in Figs. 4 and 5, and a gear 193 which meshes with a companion gear 194 located upon a companion shaft 195 journaled upon the frame 165 beneath the shaft 191 and carrying a second feed roll 196 in spaced and parallel relation to the feed roll 192. For purposes of manual operation the shaft 191 may be also provided with a squared end 198 for the accommodation of a crank and in addition carries a sprocket wheel 199 connected by means of a sprocket chain 200 with a sprocket wheel 201 connected with friction disks 201$^a$ which engage coöperating friction disks 201$^b$ located upon a short shaft 202 journaled upon the frame 165 at the rear thereof; a hand wheel 201$^c$ may be provided for properly adjusting the disks 201$^a$ and 201$^b$ with respect to each other. The shaft 202 is provided with a socket 203 arranged to receive one angular end of a shaft 204 on which a receiving roll 205 is mounted, the opposite angular end of said shaft 204 being located in the socket 203 of a second short shaft 206 journaled on the frame 165 in axial registry with the shaft 202. The shaft 206, if desired, may have a squared end 207 to accommodate a crank for facilitating the manual actuation of the receiving roll 205 should this be necessary for any reason. Additional short shafts 209 are rotatably mounted on said frame 165 in axial registry with each other and are provided with suitable sockets for removably receiving the angular ends of a shaft 210 carrying a roll 211 on which a supply of duck 212 is mounted, suitable sheeting 213 being wound between the convolutions of duck to prevent the same from becoming stuck together. Sleeves 214 slidably mounted on the respective shafts 202, 206 and 209 are adapted to be moved over the respective shaft sockets to prevent the angular ends of the shafts 204 and 210 from dropping out of the same. In order to prevent unintentional unrolling of the duck 212 one of said shafts 209 may be provided with a brake drum 215 coöperating with a band brake 216 to control the rotation speed of the roll 211; to provide for manual rotation of the latter said shaft 209 may further be provided with squared end 217 for the reception of a crank. In order to increase the capacity of the machine and to avoid delay provision may be made on the frame 165 for the accommodation of a plurality of rolls 205 and 211 capable of being used successively.

In operation the shaft 210 carrying the roll of duck 212 and sheeting 213 is placed in position in the sockets of the short shafts 209 and secured therein by means of the proper sleeves 214. The free end of the duck 212 is then carried forward and about the feed roll 196 from below and then about and over the feed roll 192. From the latter the duck 212 passes over the guide roller 55ᵃ and then travels along and in contact with the board 55ᶜ after which the duck 212 passes beneath the tension roller 55 which is properly adjusted to provide the desired tension and from thence over the main feed roller 49 from which it depends into the space between the raceway 70 and the support 135 in which the clamp bar 134 is slidably mounted; in other words the duck is now in position ready for the first cut. Meanwhile, the end of the sheeting 213 is drawn about the receiving roll 205 and the sheeting 213 is manually and progressively wound thereon through the medium of a crank upon the end 207 as the operation of positioning the duck 212 is carried out.

Either previously to the positioning of the duck in the machine or subsequently thereto the raceway 70 is adjusted to the angle at which the duck is to be cut, it being understood that this cut may be on the bias at any desired angle or straight across the fabric. The adjustment of the raceway 70 is accomplished by first loosening the nuts 75 of the bolts 73 and the cap screw 68 and then swinging said raceway 70 to the desired inclination or position, the locator 65 serving as a pivot during this adjustment of said raceway and the bolts 73 automatically positioning themselves in the grooves 74 and slots 72 in accordance with the new position of said raceway 70. After the desired adjustment has been effected the nuts 75 and the cap screw 68 are again tightened up whereby the raceway 70 is firmly clamped in position against unintentional displacement; in order that the location of the cutting mechanism may be in accord with the adjustment of the raceway 70 the position of the cable wheel 96 is adjusted relatively to the disk 98, the nuts 102 being first loosened to permit this and then tightened again to fix said cable wheel 96 in its adjusted position. The machine is now ready for operation and may be started by throwing in the clutch mechanism 21 and by engaging the clutch members 185 and 187.

This brings about a rotation of the power shaft 12 through the medium of the motor 13 or its equivalent and by means of the pinion 17 and gear 18 causes the countershaft 19 to be rotatably actuated. In this way the pivot 117 is caused to describe a circular path and thus acts as a crank and exerts an alternate push and pull upon the connecting rod 115 whereby the cross-head 111 is vertically reciprocated on the slide member 113 and a corresponding reciprocation of the rack 109 is brought about. The described operation of the rack 109 causes a rotatable rocking of the pinion 104 which is transmitted to the cable wheel 96 in the direction of the arrow in Fig. 1, it being assumed that the cutting knife 80 is at the lower end of the guideway 76 of the raceway 70. This actuation of the wheel 96, through the medium of the cable 93, exerts a pull upon the knife-actuating member 87 and moves the latter relatively to the carriage 77 within the limits of the slots 88. As the member 87 is thus relatively moved the cam-slot 86 thereof will act upon the projection 85 and project the knife 80 outwardly through the slot 90 to an operative cutting position. The relative movement of said member 87 being arrested by the slots 88 when the knife 80 has reached said cutting position, a continued operation of the cable wheel 96 in the indicated direction and a consequent continued pull on the cable 93 will draw the carriage 77 and with it the entire cutting mechanism upwardly in the guideway 76 and thus cause the knife 80 to travel lengthwise of the slot 90 in the same direction. The duck 212 will thereby be cut along a line corresponding to the cutting path of the knife as will be apparent, the angle of the cut with respect to the duck being determined by the adjustment of the raceway 70.

The rotation of the counter shaft 19 whereby the connecting rod 115 and its connected parts are actuated also operates the cam 164 whereby the member 160 is rocked on its pivot 161 in a direction to lift the connecting rod 158 and toggle-yoke 157 and thus straighten out the toggle composed of the toggle-links 154. Because of the fact that the toggle-sleeve 120 is fixed against movement in axial directions, this straightening out of said toggle-links 154 will cause them to exert an operative thrust to the right in Fig. 3 which brings about an axial movement of the toggle-sleeve 148 in the indicated direction. This movement is communicated to the rod 126 and causes the same to slide to the right in its bearings and through the medium of the rack 127 rocks the quadrant 128 and with it the shaft 129 also to the right in said Fig. 3. In this manner the levers 132 and members 133 are operated to slide the clamp bar 134 to the right in the figure previously mentioned against the surface of the duck which will thus be firmly clamped between the clamping bar 134 and the raceway 70 at points directly above and below the cutting path of the knife, the latter projecting into the groove 137 of said clamp bar throughout the cutting operation. It will be understood that the cam 164 and its associated parts are so constructed and located that the clamping of the duck as described is accomplished immediately prior to the beginning of the cutting operation and is maintained throughout the same.

After the knife 80 has traveled lengthwise of the guideway 76 the distance necessary to complete the cut, the direction of rotation of the cable wheel 96 will be reversed, this being due to the fact that the rack 109 is moved in the opposite direction because of the action of the crank 118. A downward pull will accordingly be exerted upon the cable 93 and initially will cause the knife-actuating member 87 to move in a downward direction relatively to the carriage 77 and thus, through the medium of the cam slot 86, will retract the knife 80 through the slot 90 and out of its cutting path. This relative movement of the member 87 will be arrested by the action of the slots 88 after which a continued pull on said cable 93 will return the entire cutting mechanism to the lower portion of the guideway 76 ready for the next cutting operation. Coincidentally with the above operations the action of the cam 164 will break the toggle 154 and thus will shift the rod 126 to the left in Fig. 3, whereby the clamp bar 134 is similarly moved to an inoperative position. As the clamp bar 134 is thus returned to its initial position the duck 212, if because of its tackiness it should stick thereto, will be released by contact with the support 135 as will be apparent. This actuation of the rod 126 and the consequent operation of the quadrant 128 will, through the medium of the cranks 138 and rods 140 move the stripper bar 143 downwardly whereby the stripper blade 145 is caused to loosen the duck 212 from the raceway 70 if said duck because of its tackiness, should adhere thereto. It will be understood that the section of duck which has been cut from the main supply is removed by workmen or otherwise suitably disposed of.

As the counter shaft 19 is rotated and carries with it the member 24 the rod 30 is reciprocated and causes a similar actuation of the bar 33 and second rod 35 and consequently pivotally moves the segment 37. This brings about a rotation of the pinion 39 and a corresponding movement of the ratchet disk 42 and the pawls 43 carried thereby, the latter alternately describing an operative movement and a movement of recovery. During the operative movement said pawls 43, by engagement with the teeth of the ratchet rings 46 and 47 or either of them bring about a rotative advance of the feed roller 49 whereby the duck 212 is advanced or fed, the distance for which the apparatus is set. This advance of the duck causes its free end portion to be lowered by gravity into a position ready for the next cut, it being understood that this forward feeding of said duck takes place during the return movement of the cutting mechanism. During the movement of recovery the pawls 43 simply ride back over the ratchet rings 46 and 47 without performing any function. The extent of feed of the duck may be adjusted by shifting the block 26 in the slot 25 of the member 24 whereby the reciprocating movements of the rod 30, bar 33 and second rod 35 and the pivotal movements of the segments 37 are increased or diminished as desired. Because of the staggered arrangement of the teeth of the ratchet rings 46 and 47 with respect to each other a very fine adjustment of said forward feed is possible and lost motion due to the pawls 43 slipping over the ratchet teeth before they become engaged therewith is reduced to a minimum and practically eliminated. The member 54 serves to prevent the duck 212, if it should adhere to the feed roller 49, from being carried around the same or, in other words, strips the duck from said feed roller.

Coincidentally with the operations so far described the duck 212 is being drawn from the roll 212 by the action of the feed rolls 192 and 196 and at the same time the sheeting 213 is efficiently stripped from the duck and wound upon the receiving roll 205, the action of the friction disks 201ᵃ and 201ᵇ serving to take care of the gradual increase in the diameter of the roll of sheeting; the stripping action is very positive so that said sheeting is separated from the duck regardless of how firmly it may adhere thereto. The speed of the feed rolls 192 and 196 and of the receiving roll 205 may be adjusted to properly harmonize with the advancing of the duck by the feed roller 49 by adjusting the driven disk 170 relatively to the driving disk 169 whereby an adequate supply of stripped duck always depends from the guide roller 55ᵃ so as to be readily available for proper forward feeding by the feed roller 49.

Any number of duplicate sections of duck may be successively cut with my apparatus and with the cut extending at any angle desired. The apparatus is of relatively simple construction and is positive and efficient in operation and may be easily adjusted to vary the distance between successive cuts.

Various changes in the form shown and described as well as various substitutions for illustrated and described parts may be made within the scope of the claims without departing from the spirit of my invention.

I claim:—

1. In an apparatus of the kind described an independent auxiliary frame, means thereon for rotatably supporting a roll of tacky fabric with sheeting between its convolutions, rotatable supports for carrying a receiving roll upon which said sheeting is wound, a pair of feed rolls journaled on said frame in driving connection with each other, means whereby said feed rolls are operatively connected with said receiving roll, driven mechanism operatively connected with said feed rolls whereby the latter and said receiving roll are actuated to draw the fabric from said roll and to coincidentally strip the sheeting therefrom, driving mechanism and means including a friction heel and a friction disk whereby said driving and driven mechanisms are operatively connected and whereby the speed of the latter may be varied.

2. In an apparatus of the kind described, a raceway, a carriage arranged to travel lengthwise thereof, a holder mounted upon said carriage and movable transversely thereto, a knife carried by said holder, an actuating member slidable lengthwise relatively to said carriage and provided with longitudinal slots and with a cam slot, bolts extending through said longitudinal slots whereby said actuating member is connected with said carriage and whereby its slidable movements relatively thereto are limited, a projection on said holder extending into said cam slot, a cable having its opposite ends connected with said actuating member and means for operating said cable to initially actuate said actuating member whereby said knife is moved to and from an operative position and to subsequently move said carriage lengthwise of said raceway.

3. In an apparatus of the kind described, a frame for supporting the fabric to be cut, a raceway pivotally mounted thereon so as to be adjustable to different angles, a cutting device arranged to travel lengthwise of said raceway in opposite directions, mechanism for reciprocating said cutting device in said raceway, a clamping bar for clamping said fabric adjacent to the path of the cutting device, a rod having its longitudinal axis coincidental with the pivotal axis of said raceway and slidable in a path coincident with said axis, said rod being operatively connected with said clamping bar, toggle-links connected with said rod and means for straightening out and breaking said toggle-links to actuate said rod whereby said clamping bar is moved to and from its operative position.

4. In an apparatus of the kind described, a frame for supporting a fabric to be cut, cutting mechanism mounted on said frame and pivotally connected therewith so as to be adjustable to different operative positions, clamping means for clamping the fabric adjacent to the path of said cutting mechanism, a member movably mounted to travel in registry with the pivotal axis of said cutting mechanism and toggle-links arranged to be straightened out and broken to move said member in a path coincidental with said pivotal axis of the cutting mechanism whereby said clamping means is shifted to and from an operative position.

5. In an apparatus of the kind described, a frame for supporting the fabric to be cut and provided with parallel upright members having grooves extending lengthwise thereof, a raceway pivotally mounted on said frame, means carried by said raceway and coöperating with each of said grooves to secure said raceway in an adjusted position, a cutting device arranged to travel lengthwise of said raceway, a cable wheel having an axis coincident with the pivotal axis of said raceway, a cable connected with said cutting device and with said cable wheel, a pinion connected with said cable wheel and having an axis in common therewith, a rack slidably mounted on said frame and meshing directly with said pinion, a cross-head slidably mounted on said frame and connected with said rack and means for actuating said cross-head whereby said rack is reciprocated to oscillate said pinion and cable wheel and to move said cutting device back and forth in said race way.

6. In an apparatus of the kind described, a frame, a raceway thereon, a cutting device movable lengthwise of said raceway, a feed roller for delivering the fabric to be cut to the cutting path of said cutting device, a pair of ratchet rings located within said roll in juxtaposition to each other, the teeth of said rings being advanced with respect to each other, a disk rotatably mounted within said rings, a series of pawls carried by said disk upon each of its opposite faces in engagement respectively with said ratchet rings and mechanism for actuating said disk in predetermined harmony with said cutting device whereby by individual coöperation of each series of pawls with its coöperating toothed ring, said feed roll is periodically actuated to advance the fabric at the completion of a cut.

7. In an apparatus of the kind described, a frame, a raceway thereon, a cutting device movable lengthwise of said raceway, a feed roller for delivering the fabric to be cut to the cutting path of said cutting device, means for periodically actuating said feed roller to advance said fabric at the completion of a cut, a tension roller located adjacent to said feed roller whereby said fabric is maintained under a constant tension, supporting means pivotally connected with said frame and carrying said tension roller and a member pivotally mounted on said frame and having a plurality of notches adapted for coöperation with said supporting means to fix said tension roller in different positions whereby the tension of said fabric may be adjusted.

8. In an apparatus of the kind described, a frame, a raceway thereon, a cutting device movable lengthwise of said raceway, a feed roller for delivering the fabric to be cut to the cutting path of said cutting device, means for periodically actuating said feed roller to advance said fabric at the completion of a cut, a tension roller located adjacent to said feed roller whereby said fabric is maintained under a constant tension, supporting means pivotally connected with said frame and carrying said tension roller means for adjusting the position of said tension roll to vary the tension of said fabric and a table leading to and connected at one end with said tension roll and pivoted at its other end upon said frame and arranged to automatically adjust itself in harmony with the position of said tension roll.

9. In an apparatus of the kind described, a raceway, a carriage arranged to travel lengthwise thereof and comprising connected sections, resilient means whereby said sections are spread apart into yielding contact with the walls of said raceway, cutting means carried by said carriage and means for moving said carriage lengthwise of said raceway and for coincidentally shifting said cutting means to and from an operative position.

10. In an apparatus of the kind described, a raceway, a carriage arranged to travel lengthwise thereof and comprising connected sections, resilient means whereby said sections are spread apart into yielding contact with the walls of said raceway, a holder mounted upon said carriage and movable transversely thereto, a knife carried by said holder, an actuating member slidable lengthwise relatively to said carriage and provided with longitudinal slots and with a cam slot, bolts extending through said longitudinal slots whereby said actuating member is connected with said carriage and whereby its slidable movements relatively thereto are limited, a projection on said holder extending into said cam slot, a cable having its opposite ends connected with said actuating member and means for operating said cable to initially actuate said actuating member whereby said knife is moved to and from an operative position and to subsequently move said carriage lengthwise of said raceway.

11. In an apparatus of the kind described, a frame, a cutting device movably mounted thereon, a feed roller for delivering the fabric to be cut to said cutting device, ratchet mechanism connected with said feed roller and including a pinion, a toothed segment arranged to mesh with said pinion, means for operating said segment to actuate said pinion and ratchet mechanism, an eccentric bushing upon which said segment is pivoted and whereby the latter may be bodily shifted into and out of engagement with said pinion, a pivot shaft on said frame on which said eccentric is mounted and a locking lever for rotatably actuating said eccentric bushing relatively to the segment and to said pivot shaft to either lock said segment in operative engagement with said pinion or to disengage it therefrom to permit an independent rotation of said feed roller.

12. In an apparatus of the kind described, a frame for supporting the fabric to be cut, cutting mechanism movably mounted upon said frame, clamping means for clamping the fabric in operative relation to said cutting mechanism, mechanism for operating said clamping means, a connecting rod connected with said clamping means and with said mechanism, an eccentric included in the connection between said rod and said mechanism and a locking lever for rotatably actuating said eccentric relatively to said rod and mechanism to shift said clamping means independently of said actuating mechanism.

In testimony whereof I hereunto set my hand.

JULIUS WEGNER.